June 30, 1970  G. CORTI ET AL  3,517,776
WHEEL BLOCKING SAFETY MECHANISM
Filed Oct. 21, 1968  3 Sheets-Sheet 1
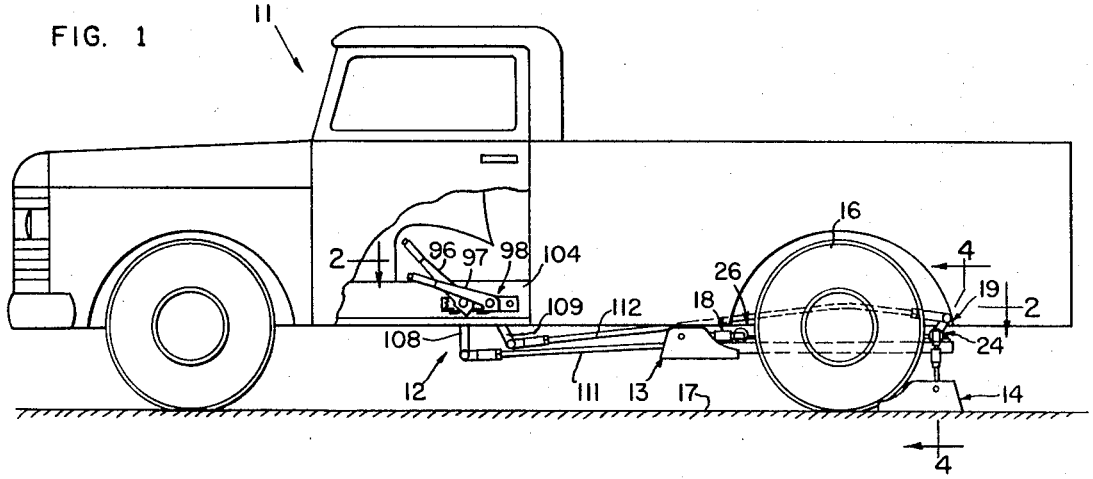
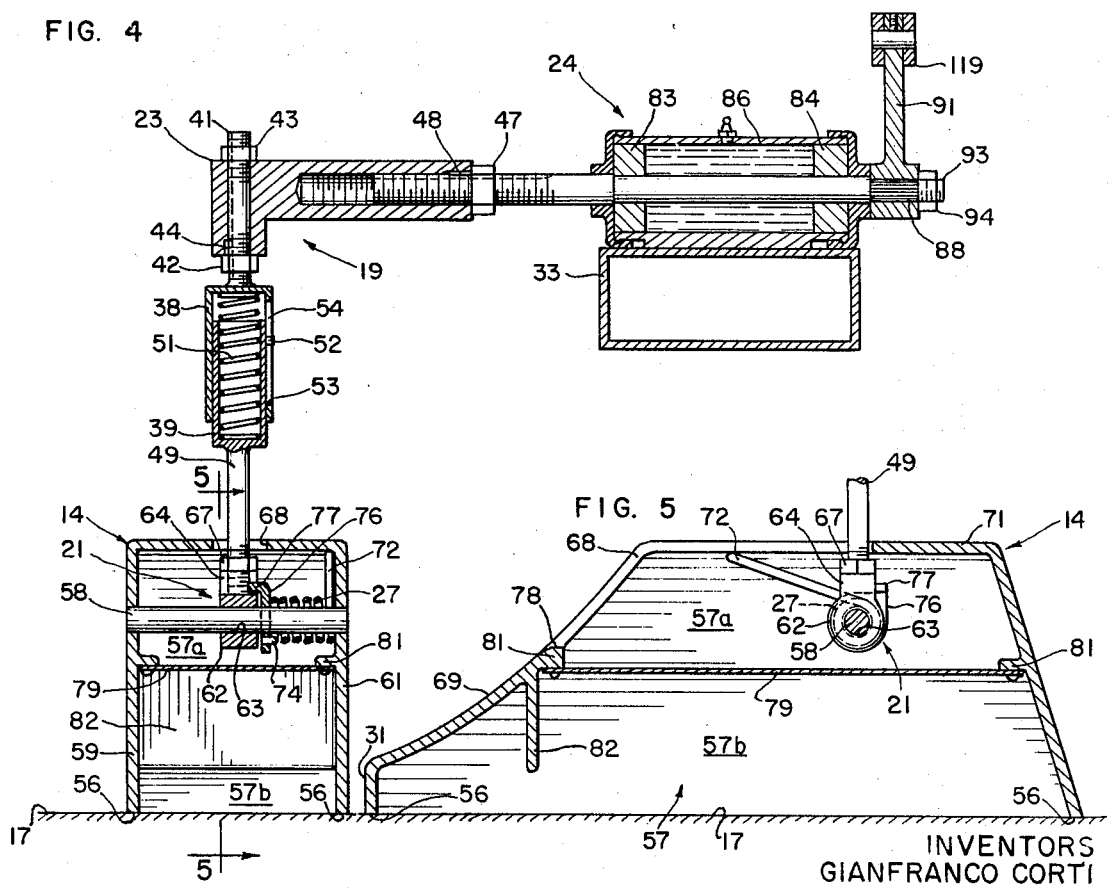
INVENTORS
GIANFRANCO CORTI
ROY G. San MARTINO
BY Warren, Rubin,
Brucker & Chickering
ATTORNEYS

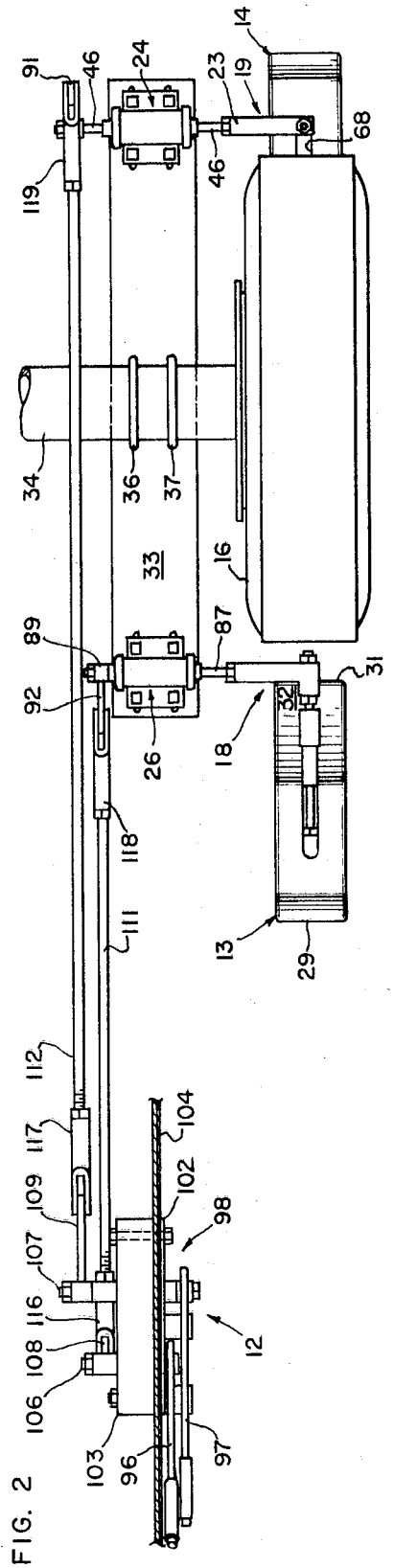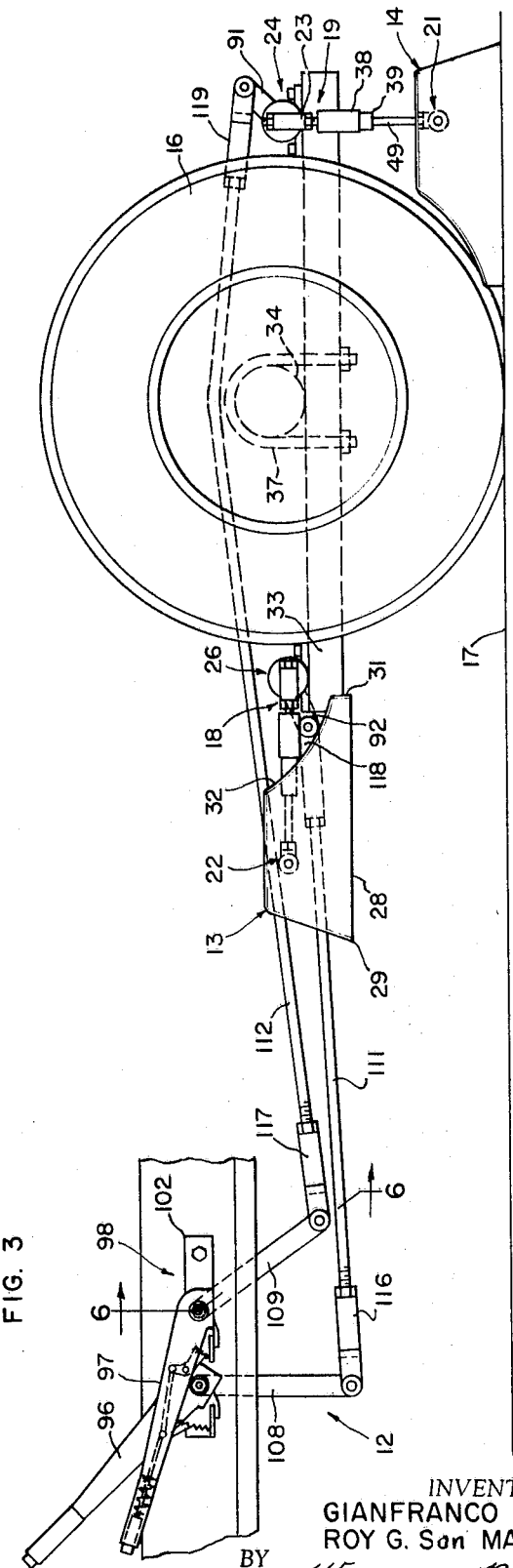

June 30, 1970    G. CORTI ET AL    3,517,776
WHEEL BLOCKING SAFETY MECHANISM
Filed Oct. 21, 1968    3 Sheets-Sheet 3
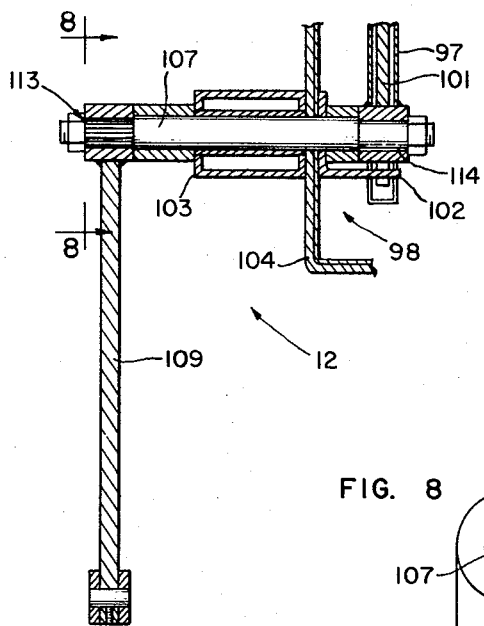
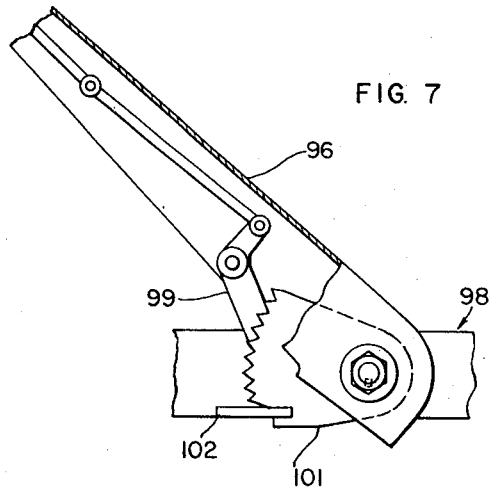
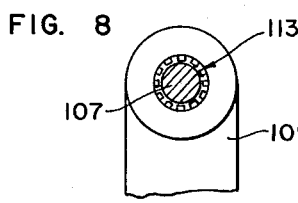
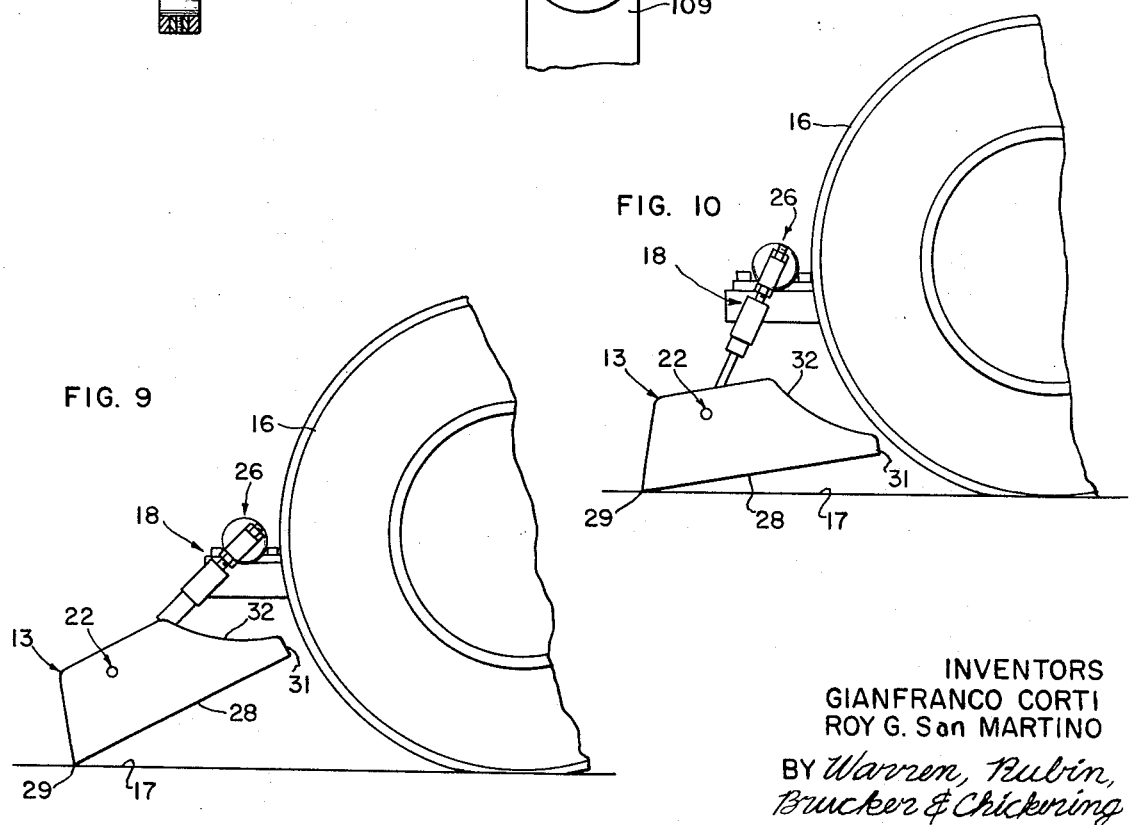
INVENTORS
GIANFRANCO CORTI
ROY G. San MARTINO
BY Warren, Rubin,
Brucker & Chickering
ATTORNEYS

United States Patent Office 3,517,776
Patented June 30, 1970

3,517,776
WHEEL BLOCKING SAFETY MECHANISM
Gianfranco Corti, 4337 Masterson St., Oakland, Calif.
94619, and Roy G. San Martino, 1532 Greenwood
Road, Pleasanton, Calif. 94566
Filed Oct. 21, 1968, Ser. No. 769,256
Int. Cl. B60t 1/04
U.S. Cl. 188—4                                    4 Claims

ABSTRACT OF THE DISCLOSURE

In a vehicle carried, remote controlled, wheel blocking mechanism means are provided for articulating a wedge-shaped chock between retracted and blocking positions with respect to the wheel such that the toe end of the chock remains elevated from the ground during most of its movement toward a blocking position. In this manner ground protrusions and road debris are effectively traversed prior to entry of the chock into wedging or blocking orientation between the wheel and ground. Particularly, this is achieved by spring biasing the chock to a pre-set rotated position relative to a vehicle mounted pivot arm, such that as the pivot arm rotates the chock toward the wheel blocking position, the heel edge of the chock initially engages the ground with further such movement of the arm sliding the chock heel thereover toward the wheel and concurrently rotating the chock toe into wedging position. The reliable operation provided by this arrangement of parts is further enhanced by forming the chock with a generally open bottom for spanning loose road debris and ground protrusions as the chock is moved into wheel blocking position thereby insuring a safe and secure wheel-ground contact. Additionally, means are provided for rendering the pivot arm self-adjusting to varying distances between the vehicle and ground to assure proper positioning of the chock under all operating conditions.

---

The present invention relates to wheel blocking safety mechanisms of the type carried by a vehicle and controlled from the driver's compartment.

Mechanisms of this type have the advantage of permitting vehicle operators to place wheel safety chocks into position without leaving the driver's seat and thus without relinquishing control of the vehicle. For example, a truck driver whose emergency brakes are failing but has managed to bring the vehicle to a stop may operate the mechanism from the driver's cabin and thus safely block his wheels; an operation which obviously cannot be safely performed if the driver must get out of the vehicle and manually position the wheel chocks. With this background, there have been a number of mechanisms designed to accomplish this desirable operation, of which the disclosures of Pats. Nos. 1,653,420, 1,762,-997, 1,898,896, 2,182,044, and 2,386,595 are illustrative. While a variety of remote controlled wheel blocking mechanisms have been proposed, none, to our knowledge, have found commercial acceptance, notwithstanding the recognized advantages which they have to offer in providing for safety of commercial vehicles and their contents, and in preventing personal injury and property damage.

One of the problems of these devices is their inability to reliable position the chock into snug, sure engagement between the wheel and ground under the wide variety of diverse conditions which the mechanism must operate. For example, it is often necessary to stop and secure the vehicle on the irregular surface of a roadway where the proper positioning of the chock is interferred with or prevented by the presence of protruding rocks or gravel or uneven ground.

Additionally, the mechanism must operate reliably even though the distance between the vehicle and ground varies from time to time as between loaded and unloaded conditions of the truck, substantial irregularities of the ground, and variations in tire pressure.

Accordingly, it is an object of the present invention to provide a remote controlled wheel blocking mechanism which will operate reliably and efficiently under all conditions of road or ground irregularities.

It is a further object of the present invention to provide in such a mechanism, operation which is independent of the distance between the vehicle and ground yet functions with a controlled positive action.

The invention possesses other objects and features of advantage, some of which of the foregoing will be set forth in the following description of the preferred form of the invention which is illustrated in the drawings accompanying and forming part of this specification. It is to be understood, however, that variations in the showing made by the drawings and description may be adopted within the scope of the invention.

In the drawings:

FIG. 1 is a side elevation partially cut away for clarity showing a vehicle equipped with the remote controlled blocking mechanism constructed in accordance with the present invention;

FIG. 2 is a fragmentary cross-sectional view on an enlarged scale of the blocking mechanism taken generally along plane of line 2—2 of FIG. 1;

FIG. 3 is a side elevation of the mechanism shown in FIG. 2;

FIG. 4 is a cross-sectional view on further enlarged scale of a portion of the mechanism taken generally along plane of line 4—4 of FIG. 1;

FIG. 5 is a cross-sectional view of a portion of the apparatus shown by FIG. 4 taken generally along plane of line 5—5 of FIG. 4;

FIG. 6 is a cross-sectional view of a portion of the apparatus taken generally along the plane of line 6—6 of FIG. 3;

FIG. 7 is a fragmentary side elevational view of a portion of the mechanism;

FIG. 8 is a fragmentary cross-sectional view on an enlarged scale taken substantially on the plane of line 8—8 of FIG. 6;

FIG. 9 is a fragmentary side elevation of the wheel blocking mechanism in an intermediate position; and FIG. 10 is a side elevation of the mechanism similar to FIG. 9 but showing the mechanism in another position.

With reference to FIG. 1, devices of the type considered above are adapted to be mounted on and carried by a vehicle 11 and operated through a remote control means 12 located within the driver's compartment as shown. In general, by the manipulation of control means 12, one or a pair of wheel chocks, as in this instance fore and aft chocks 13 and 14, are lowered into a blocking position with respect to a wheel 16 and ground 17 to secure the vehicle. With this fundamental operation in mind, the present invention provides a unique manner of articulating the chock between its inoperative relatively elevated position spaced from wheel 16 and ground 17 as shown by chock 13 in FIG. 1, and an operative position wedged against the wheel and ground as shown by chock 14. As will be seen the articulation provided insures reliable, smooth and positive movement between these positions especially in situations where ground 17 is irregular and would otherwise impede the placement of the chock. This particular articulation is best illustrated by FIGS. 9 and 10 which show successive stages of the movement of chock 13 intermediate its inoperative or retracted and operative terminal positions. As will be more fully described herein but as generally indicated by FIGS. 9 and 10, chock 13 is oriented during movement to its operative position so as to avoid catching its toe on road protrusions or from scooping loose debris in between the tire and the chock.

In order to provide the foregoing operation, the present invention comprises connecting arms 18 and 19, respectively mounted between vehicle 11 and chocks 13 and 14, and being provided with pivotal connections 21 and 22 to an associated chock for aligned rotation of the chocks with respect to the outer circumference or tread of wheel 16, the axis of the pivotal connection being parallel to that of wheel 16. Additionally, each arm is comprised of a 90° elbow connector, such as connector 23 for arm 19 as shown by FIG. 4, for extending the arms into second pivotal connections, indicated generally at 24 for arm 19 and 26 for arm 18 as shown by FIG. 2, which are in turn securely fastened to vehicle 11. By this arrangement, arms 18 and 19, which are operatively connected to control means 12, may be reciprocated for arcuate displacement of chocks 13 and 14 between their retracted or inoperative position and blocking or operative position against wheel 16 and ground 17. Additionally, each blocking mechanism comprises a spring means associated with first pivotal connections 21 and 22 for biasing the chock to a pre-set rotated position with respect to its connecting arm. The spring means in this instance is provided by a helical spring 27 associated with chock 14 and arm 19 as shown by FIG. 4 and a like construction for arm 18 and chock 13 (not shown).

This pre-set or biased rotational position of the chock is best illustrated by FIG. 9, wherein chock 13 formed with a ground engaging base 28 is lowered by arm 18 from the retracted position such that a heel end 29 of the chock initially contacts ground 17 as shown. In other words, as chock 13 is rotated from its inoperative to operative position, heel end 29 is lowermost and its toe end 31 is relatively elevated at the time the chock initially contacts the ground whereupon further rotation of arm 18 causes firstly a rotary displacement of the chock about pivotal connection 22 against the spring bias until base 28 seats flush on the ground, and secondly a sliding of the chock on the ground into engagement with the tire 16. It will be noted in FIG. 10 that the inclination of base 28 over ground 17 maintains toe end 31 out of interference with any protruding rocks or debris which may be present on the ground. The final stages of displacement of arm 18 following from the position shown by FIG. 10, complete the rotation and sliding movement of chock 13 into a blocking or operative disposition with base 28 flat on ground 17 and a wheel engaging face 32 of the chock wedged against the tread of wheel 16. The resulting blocking orientation is best illustrated by FIG. 3 for chock 14.

With reference to FIGS. 9 and 10, and assuming that chock 13 is now in its operative or blocking position, arm 18 may now be rotated in a reverse direction to return the chock to its inoperative retracted orientation. For this purpose, it may in some cases be necessary to move the vehicle and thus wheel 16 out of engagement with chock 13 to release toe end 31 thereof, whereby the spring bias operating on pivotal connection 22 will force toe end 31 upwards as the chock is slid backwards away from wheel 16. Further reciprocation of arm 18 thereby returns chock 13 to its pre-set biased orientation as shown in FIG. 9, and subsequent upward retraction into the inoperative position.

In accordance with the present construction, the pivotal connections 24 and 26 for arms 18 and 19 are located with reference to axle 34 for wheel 16, so that such locations are independent of vehicle body load. For this purpose a mounting member 33, here in the form of a rigid inverted channel member, is fastened directly to axle 34 by U-bolts 36 and 37, see FIGS. 2 and 3, so that member 33 extends generally parallel to the plane of wheel 16 and interior thereof. Pivotal connections 24 and 26 are located at the opposite ends of member 33 and arranged with their axes parallel to each other and to shaft 34. In addition to stabilizing the operating distances of arms 18 and 19 relative to the ground under varying load conditions, it is also necessary to provide adjustment for differences in elevation of pivotal connections 24 and 26 relative to the ground due to tire pressure variations and unevenness of the ground adjacent to wheel 16. In order to compensate for these latter variables, arms 18 and 19 are here constructed to permit relative contraction and expansion between their first and second pivotal connections. Additionally, in order to insure that arms 18 and 19 are sufficiently extended in each instance, means is provided for spring biasing the arms toward their extended positions. By this ararngement, chocks 13 and 14 are insured of proper and reliable placement independent of local ground undulations adjacent wheel 16 and independent of the degree of compression of wheel 16 between its axle and the ground upon which it rests.

In accordance with the present invention, the foregoing feature has been advantageously provided by forming each of arms 18 and 19 with mated, cylindrical telescoping sections, such as sections 38 and 39 of arm 19, as best shown by FIG. 4. Also as shown therein, the remote ends of sections 38 and 39 are rigidly attached respectively to pivotal connections 24 and 21. Particularly, the remote end of section 38 is so connected by means of a threaded shaft 41, connector 23 secured to shaft 41 by locking nuts 42 and 43 and key 44; and a shaft 46 threaded into connector 23 and secured by nut 47 and key 48. These foregoing connecting parts between section 38 and pivotal connection 24 provide for installation adjustments of the displacement of chock 14 relative to pivotal connection 24. The remote end of section 39 is connected through a shaft 49 to pivotal connection 21. Section 39 is formed with a hollow interior to accommodate a helical spring 51 mounted within the elongated chamber thus provided by sections 38 and 39 for biasing arm 19 to its extended position which is defined in this instance by the engagement of a pin 52 carried by section 39 against a lowermost end 53 of a slotted opening 54 formed in section 38. Additionally, pin 52 and slotted opening 54 serve to maintain the alignment of chock 14 with wheel 16 by preventing relative rotation of sections 38 and 39.

It has been found when operating devices of this type, as the chocks are lowered into position they may come to rest in a blocking position with their base resting atop a stone or other protruding obstacle on the road adjacent the tire. In such a case, it is apparent that the wheel chock without being firmly supported by the surrounding ground surface cannot safely secure the wheel against movement. Accordingly, the present invention provides for forming chocks 13 and 14 with substantially hollow bases as best illustrated by chock 14 shown in FIGS. 4 and 5, having circumferential supporting edge 56 bounding a generally hollow bottom or interior and which will span protruding obstacles such as loose rock, or the like to provide a firm ground support. It will be apparent that this function and the corresponding construction of the chock is specially and advantageously adapted for co-functioning with the particular articulation of the chocks as taught by the present invention. That is, as the chock is moved into position with its toe elevated as described with reference to FIGS. 9 and 10, the hollow bottom comes down upon and bridges or spans road protrusions which are perchance located adjacent the tire and would otherwise interfere with proper blocking placement.

Additionally, the generally hollow interior of each chock provides a convenient, protective chamber for the parts of pivotal connections 21 and 22 and their associated spring means. With reference to FIGS. 4 and 5, pivotal connection 21 is comprised of a shaft 58 positioned within hollow interior 57 of chock 14, extending parallel to the axis of wheel 16 for aligned reciprocation of chock 14, and supported on opposite ends by opposing side walls 59 and 61 of the chock. A bearing member 62 is mounted on shaft 49 and is provided with an opening 63 journaled to shaft 58. An end of shaft 49 is threaded into a boss 64 on bearing member 62 and is locked in place by nut 67.

In order to accommodate the rotational reciprocation of chock 14 relative to arm 19, a slotted opening 68 is provided extending through a wheel engaging face wall 69 and top wall 71 of chock 14. Opening 68 is positioned generally centrally between opposing sides of chock 14 extending along the plane defined by rotation thereof relative to arm 19.

As indicated, the spring bias about pivotal connection 21 is preferably mounted therewith inside chock interior 57, and for this purpose, spring 27 is of helical form and mounted coaxially about shaft 58 as shown in FIGS. 4 and 5. Spring 27 is provided with an elongated end portion 72 adjacent the interior of side wall 61 and rests in engagement with the interior junction of face wall 69 and top wall 71. To place spring 27 under tension for forcing the toe end 31 of chock 14 upward in a clockwise direction, as seen in FIG. 5, a second end 74 of spring 27 is secured by a collar bracket 76 mounted adjacent and coaxially of member 62 and having a flange portion engaging portion 64 of member 62 as shown in FIGS. 4 and 5.

Co-functioning with spring 27 a terminal end 78 of slot 68 is positioned to provide a stop for shaft 49 limiting and defining the aforementioned pre-set rotated orientation of the chock relative to its associated arm in the retracted or inoperative position. That is, terminal end 78 of slot 68 is so positioned that as chock 14 is lowered into position, its heel end 79 initially engages ground 17 as described with relation to chock 13 and FIGS. 9 and 10.

Furthermore, terminal end 78 of opening 68 engaging shaft 49 as shown in FIG. 5 is preferably positioned such that the base of the chock is oriented parallel to and facing ground 17 when the chock in its fully retracted or inoperative position. This disposition is best illustrated by FIGS. 1 and 3 for chock 13, wherein base 28 thereof is parallel to ground 17 and substantially spaced therefrom maintaining heel and tip ends 29 and 31 in a position in which they are least likely to catch upon road obstacles during vehicle movement. Furthermore, it will be apparent that spring means such as spring 27 maintains the chock in this compact retracted orientation even though ice, mud or the like may accumulate on one or the other ends of the chock and thus otherwise tilt it into a less desirable orientation.

In the preferred embodiment, where the chocks are formed with hollow or open bottoms as illustrated for chock 14 by FIGS. 4 and 5, interior 57 is provided with a dirt impervious partition 79 separating interior 57 into a generally upper portion 57a surrounding and guarding pivotal connection 21 from debris and a lower portion 57b defining a vacant space with the open bottom for providing the aforementioned advantages during placement of the chock. Partition 79 in this instance is mounted generally parallel to ground 17 approximately bi-secting the interior chamber of chock 14 and is mounted with suitable means to an interior supporting flange 81 as shown in FIGS. 4 and 5. Additionally, a strengthening rib 82 may be formed within the chock adjacent to wheel engaging face wall 69 for reinforcement thereof, as shown by FIG. 5.

Pivotal connections 24 and 26, as best seen in FIG. 4, are each here formed by a pair of bearings 83 and 84 supported within an oil reservoir housing 86 which in turn is mounted to channel 33 by a base flange as seen in FIG. 2. These connections are of similar construction so a description of connection 24 shown in FIG. 4 will suffice for both. Shaft 46 is mounted coaxially through housing 86 and is journalled in bearings 83 and 84 to provide smooth, trouble-free rotational reciprocation of the arms.

In order to provide remote controlled rotation of arms 18 and 19, shafts 46 and corresponding shaft 87 for connection 26, are provided with adjustable spline connections 88 and 89 to lever arms 91 and 92, respectively. This spline connection is best illustrated in FIG. 4 as connection 88, and is secured in place by lock nut 93 threaded on an end portion 94 of shaft 46. Spline connections 88 and 89 permit adjustable orientation of lever arms 91 and 92 relative to the angular orientation of arms 19 and 18.

While it is apparent that lever arms 91 and 92 may be reciprocated by a number of different remote controlled means operated from the cabin of vehicle 11, such as hydraulic or electrical, a wholly mechanical means 12 has been employed in this instance. For this purpose, a pair of manually operable levers 96 and 97 are suitably mounted within the cabin of vehicle 11 by mounting means 98 secured to the body of vehicle 11 adjacent the driver's seat. Each of levers 96 and 97 are equipped with pushbutton controlled pawl portions and cooperating ratchet portions as best shown by FIG. 7, as pawl portion 99 and ratchet portion 101 of lever 96. Further details of the mounting of lever arms 96 and 97 are illustrated in FIGS. 2, 3 and 6 wherein mounting means 98 comprises brackets 102 and 103 secured by suitable fastening means on opposite sides of a side wall 104 of the vehicle body adjacent the driver's seat. By this arrangement, operation of lever arms 96 and 97 within the vehicle cabin effect displacement of lever arms 91 and 92 by means of connecting shafts 106 and 107, as best shown for shaft 107 by FIG. 6, connecting arms 108 and 109 best shown by FIG. 3, and connecting rods 111 and 112 best shown by FIGS. 2 and 3.

To provide the proper drive communication between levers 96 and 97, and lever arms 92 and 91, respectively, for rotating arms 18 and 19 between operative and inoperative positions, the following connections are employed. With reference to FIG. 6, shaft 107 is secured against relative angular rotation between lever 97 and arm 109 by a pair of spline connections 113 and 114 located at opposite ends of shaft 107, and shaft 106 is similarly secured by spline connecting means (not shown) between lever 96 and arm 108. These spline connections are identical and best illustrated by FIG. 8 for connection 113. Thus, rotation of levers 96 and 97 results in respectively equal angular displacements of arms 108 and 109.

Connecting rods 111 and 112 are rotatably secured at each of their ends through clevis connectors 116, 117, 118 and 119 between the ends of arms 108 and 109 distal levers 96 and 97, and the ends of lever arms 91 and 92 distal pivotal connections 24 and 26. Thus, angular displacement of lever arms 108 and 109 as above provided cause proportional angular movements of arms 92 and 91 which in turn articulate chocks 13 and 14. Furthermore, it will be apparent that suitable dimensioning of the length ratios between lever arms 108 and 109 and respectively lever arms 92 and 91 may be provided to achieve approximately 90° of rotation of arms 18 and 19, i.e. that required in this instance between the inoperative and operative positions of chocks 13 and 14.

What is claimed is:

1. In a remote controlled wheel blocking mechanism carried by a vehicle and including a wedge-shaped wheel chock mounted for movement between an operative position in engagement with a vehicle wheel and ground and an inoperative relatively elevated position spaced from said wheel and ground; the improvement comprising:

a chock of hollow inverted cup shaped form having an inclined top wheel engaging wall extending between forwardly and rearwardly disposed toe and heel portions and a depending peripheral wall defining an interial chamber and at its lower end an open ground engaging base, said top wall being formed with a fore-and-aft extending slotted opening, an arm mounted through said opening and pivoted to said chock within said chamber for rotation about a transverse axis and in the plane of said opening, pivotal mounting means for said arm for arcuate displacement of said chock between operative and inoperative positions, said arm being formed of spring biased extensible sections for automatically adapting to the distance between said vehicle and ground, and spring means connecting said arm and chock for biasing said chock to a predetermined rotated position on said arm orienting said heel portion lowermost during movement toward operative position, the pivotal connection between said arm and chock being positioned to produce rotary displacement of said chock on said arm against the resistance of said spring means upon ground contact of said heel portion to place said base on the ground for movement of said top wall against said wheel in operative position.

2. The combination of claim 1, a shaft secured to said chock interiorly of said chamber and extending transversely thereof perpendicularly to the fore-and-aft line connecting said heel and toe portions, and said spring means comprising a helical spring mounted on said shaft and having its opposite ends connected to said arm and chock.

3. The combination defined in claim 2, and a partition wall carried by said chock interiorly of said chamber and enclosing said shaft and helical spring from said base.

4. The combination defined in claim 2, said slotted opening providing an end engageable with said arm for limiting rotation of said chock thereon and cofunctioning with said spring to position said chock with its base generally parallel to and facing the ground while in inoperative position.

References Cited

UNITED STATES PATENTS

| | | |
|---|---|---|
| 2,182,044 | 12/1939 | Ackerman. |
| 3,086,619 | 4/1963 | Grotz. |
| 3,176,798 | 4/1965 | Nesselberger. |

FOREIGN PATENTS

| | | |
|---|---|---|
| 112,704 | 1/1918 | Great Britain. |
| 153,387 | 11/1920 | Great Britain. |
| 606,187 | 7/1960 | Italy. |

GEORGE E. A. HALVOSA, Primary Examiner

U.S. Cl. X.R.

188—32